United States Patent
Crossman et al.

(10) Patent No.: US 10,952,833 B2
(45) Date of Patent: Mar. 23, 2021

(54) SPRING MECHANISM FOR POWER DEVICE

(71) Applicant: Ranir, LLC, Grand Rapids, MI (US)

(72) Inventors: Scott P. Crossman, Rockford, MI (US); Kevin J. Kollar, Ada, MI (US); Kevin G. Yost, Evanston, IL (US); Dai Xiaoguo, Shanghai (CN); Michael A. Andrew, Monona, WI (US); Thomas P. Blandino, Cottage Grove, WI (US); Stephen J. Dieter, Oregon, WI (US); John C. Mehnert, Madison, WI (US); Andrew P. Wilke, Madison, WI (US); Mark A. Penrod, Delton, MI (US)

(73) Assignee: Ranir, LLC, Grand Rapids, MI (US)

( * ) Notice: Subject to any disclaimer, the term of this patent is extended or adjusted under 35 U.S.C. 154(b) by 1288 days.

(21) Appl. No.: 14/560,175

(22) Filed: Dec. 4, 2014

(65) Prior Publication Data
US 2015/0150664 A1 Jun. 4, 2015

Related U.S. Application Data

(60) Provisional application No. 61/911,701, filed on Dec. 4, 2013.

(51) Int. Cl.
*A61C 17/34* (2006.01)
*A61C 17/22* (2006.01)

(52) U.S. Cl.
CPC ........ *A61C 17/3472* (2013.01); *A61C 17/222* (2013.01); *A61C 17/3418* (2013.01); *Y10T 74/18856* (2015.01)

(58) Field of Classification Search
CPC .............. A61C 17/3472; A61C 17/222; A61C 17/3418; A61C 17/26; Y10T 74/18856
USPC ................... 15/22.1, 22.2, 22.4, 28
See application file for complete search history.

(56) References Cited

U.S. PATENT DOCUMENTS

| 3,196,298 A | * | 7/1965 | Kent | .................. | A61C 17/3418 15/22.1 |
| 3,335,443 A | | 8/1967 | Parisi | | |
| 3,375,820 A | | 4/1968 | Kuris | | |
| 3,488,788 A | | 1/1970 | Robinson | | |

(Continued)

FOREIGN PATENT DOCUMENTS

| CA | 2560707 | 9/2006 |
| CN | 101297776 | 11/2008 |

(Continued)

*Primary Examiner* — Laura C Guidotti
*Assistant Examiner* — Thomas Raymond Rodgers
(74) *Attorney, Agent, or Firm* — Warner Norcross + Judd LLP

(57) ABSTRACT

A spring mechanism for attaching to a power device drive unit includes a housing connectable to a portion of the power device and a shaft extending through the housing. One end of the shaft is coupled to a workpiece and a bottom member extends from the other end and is positioned adjacent the drive unit. The bottom member includes at least one of a ferromagnetic material and a permanent magnet. The bottom member, shaft and workpiece move upon actuation of the drive unit, and a spring extends laterally outwardly from the shaft between the shaft and the housing. The spring is affixed to one of the shaft and the housing, wherein the spring bends between a deformed position and a return position upon the movement of the bottom member.

11 Claims, 12 Drawing Sheets

(56) References Cited

U.S. PATENT DOCUMENTS

| | | |
|---|---|---|
| 3,535,726 A | 10/1970 | Sawyer |
| 3,676,218 A | 7/1972 | Sawyer |
| 3,828,770 A | 8/1974 | Kuris |
| 3,980,906 A | 9/1976 | Kuris |
| 4,192,035 A | 3/1980 | Kuris |
| 4,333,197 A | 6/1982 | Kuris |
| 4,991,249 A | 2/1991 | Suroff |
| 5,138,733 A | 8/1992 | Bock |
| 5,150,492 A | 9/1992 | Suroff |
| 5,189,751 A * | 3/1993 | Giuliani ............... A61C 17/20 15/22.1 |
| 5,247,716 A | 9/1993 | Bock |
| 5,311,632 A | 5/1994 | Center |
| 5,369,831 A | 12/1994 | Bock |
| 5,378,153 A | 1/1995 | Giuliani et al. |
| 5,546,624 A | 8/1996 | Bock |
| 5,613,259 A | 3/1997 | Craft et al. |
| 5,784,742 A | 7/1998 | Giuliani et al. |
| 6,845,537 B2 | 1/2005 | Wong |
| 6,918,300 B2 | 7/2005 | Grez et al. |
| 7,024,717 B2 | 4/2006 | Hilscher |
| 7,067,945 B2 | 6/2006 | Grez et al. |
| 7,086,111 B2 | 8/2006 | Hilscher |
| 7,207,080 B2 | 4/2007 | Hilscher |
| 8,587,162 B2 * | 11/2013 | Kagami ............... A61C 17/32 15/21.1 |
| 2002/0092104 A1 * | 7/2002 | Ferber ............... A61C 17/224 15/22.1 |
| 2003/0204924 A1 | 11/2003 | Grez et al. |
| 2004/0255409 A1 | 12/2004 | Hilscher |
| 2005/0000044 A1 | 1/2005 | Hilscher |
| 2005/0011025 A1 | 1/2005 | Hilscher |
| 2005/0102773 A1 * | 5/2005 | Obermann ......... A61C 17/3418 15/4 |
| 2006/0170293 A1 * | 8/2006 | Grez ............... A61C 17/3418 310/50 |
| 2007/0234493 A1 | 10/2007 | Hilscher |
| 2008/0010771 A1 | 1/2008 | Hilscher |
| 2008/0020351 A1 | 1/2008 | Hilscher |
| 2008/0020352 A1 | 1/2008 | Hilscher |
| 2008/0022469 A1 | 1/2008 | Hilscher |
| 2008/0022470 A1 | 1/2008 | Hilscher |
| 2008/0022471 A1 | 1/2008 | Hilscher |
| 2008/0022501 A1 | 1/2008 | Hilscher |
| 2008/0022503 A1 | 1/2008 | Hilscher |
| 2008/0028549 A1 | 2/2008 | Hilscher |
| 2008/0032265 A1 | 2/2008 | Hilscher |
| 2008/0034515 A1 | 2/2008 | Hilscher |
| 2009/0019651 A1 * | 1/2009 | Grez ............... A61C 17/222 15/22.1 |

FOREIGN PATENT DOCUMENTS

| | | |
|---|---|---|
| DE | 20321197 | 6/2006 |
| DE | 102007029972 | 1/2009 |
| WO | 9216160 | 10/1992 |
| WO | 2004054467 | 7/2004 |
| WO | 2005058189 | 6/2005 |
| WO | 2009000418 | 12/2008 |

* cited by examiner

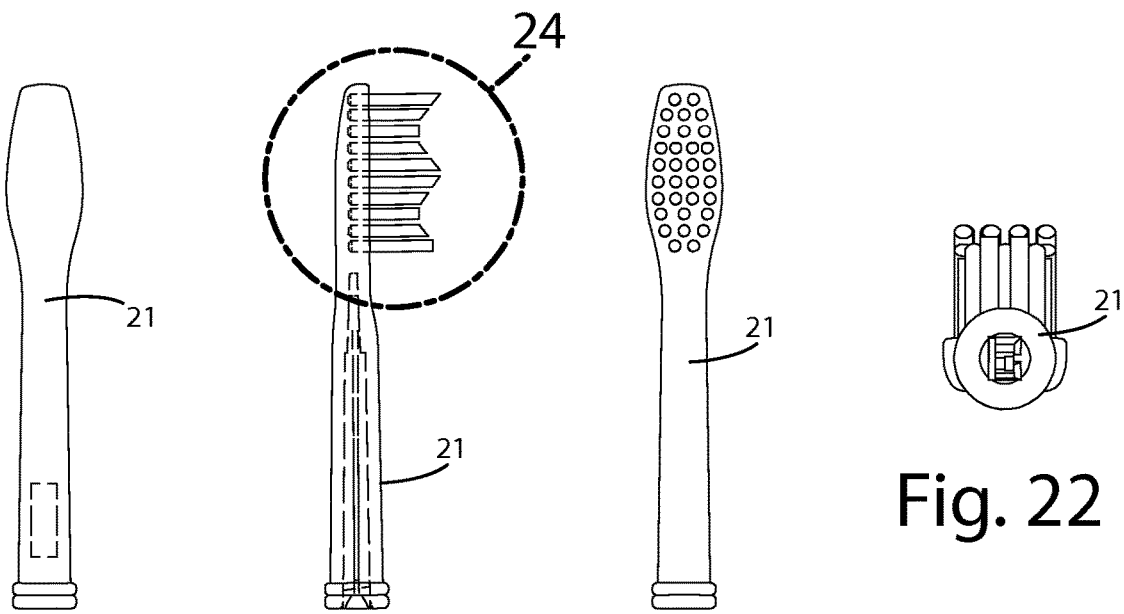
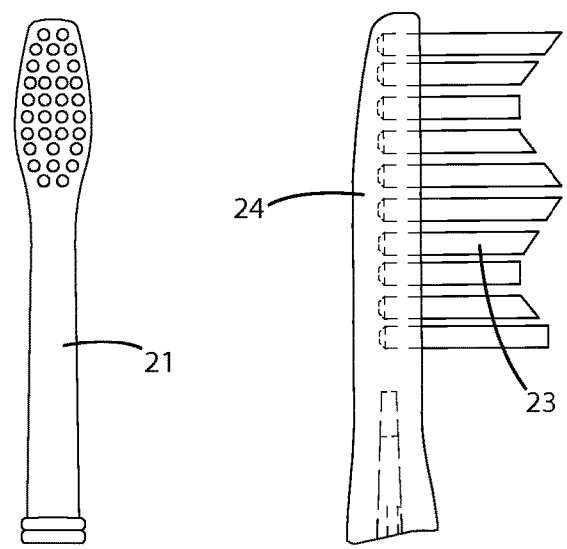
Fig. 19  Fig. 20  Fig. 21  Fig. 22
Fig. 23  Fig. 24

SPRING MECHANISM FOR POWER DEVICE

BACKGROUND OF THE INVENTION

The present invention is directed to electromagnetically powered devices, and, more particularly, to powered devices such as electric toothbrushes and power exfoliators having an electromagnetic drive unit.

One method for actuating the bristles, or other cleaning elements, of an electric toothbrush or another device having a powered handle is an electromagnetic drive positioned within the handle portion of the toothbrush or other device. The electromagnet can be actuated by a switch to operate at a desired frequency. A movable permanent magnet is positioned proximate to the electromagnet, such that the permanent magnet is driven to oscillate at an oscillating frequency by the electromagnet when the electromagnet is actuated. An elongated neck including a workpiece such as a brush head is typically attached to the permanent magnet, such that the workpiece is driven to oscillate by the movement of the permanent magnet.

Recognizing the need to replace certain aspects of these workpieces, such as toothbrush bristles, after they are worn out or in order to provide more flexibility, e.g., to attach a different head with a different function, manufacturers have designed replacement heads that fit onto separate electromagnetic drive units. The drive units typically include the power source, switch, and electromagnet, and the replacement heads typically include the permanent magnet and the workpiece. The replacement heads can be removably attached to the drive units, for instance, by threading or otherwise connecting a portion of the replacement head onto a portion of the drive unit. In some instances, both the electromagnet and the permanent magnet are positioned in the drive unit, with a workpiece shaft extending outwardly from the drive unit that is capable of receiving a simpler replacement portion containing only the workpiece, such as the neck and head of a toothbrush.

More recently, manufacturers have attempted to control the movement of these workpieces, in order to provide a more desirable workpiece motion. For example, in the case of electric toothbrushes, manufacturers have attempted to control the movement of the cleaning elements in a rotational motion about the central longitudinal axis of the toothbrush. Difficulties arise in doing so, especially in the case of toothbrushes with electromagnetic drives, because the generally linear oscillation caused by the electromagnet must be converted into the desired rotational motion. Some replacement heads include parts that may contribute to vibrations and/or noise in the electric toothbrush that may be undesirable or annoying.

SUMMARY OF THE INVENTION

The present invention provides a spring mechanism for an electromagnetically powered device that converts or translates the movement of the electromagnet into a desired movement of the workpiece.

In one embodiment, the drive unit includes a handle member incorporating an electromagnet. The spring mechanism includes a spring shaft with a first end coupled to a bottom member and a second end coupled to a workpiece, such as a bristle head. A pair of permanent magnets are associated with the bottom member and the permanent magnets oscillate with the frequency of the electromagnet. A spring has a first end attached to the spring shaft and a second end connected to a fixed spring housing. The spring alternates between a deformed position and a return position during oscillation of the permanent magnets via the motion of the spring shaft, such that the bending of the spring causes the bristle head to move in a desired motion.

In another embodiment, the spring member is a flat spring having a first end fixed to or operatively engaged with the spring shaft and a second end fixed to or operatively engaged with the spring housing. The bottom member and the spring shaft may be generally unconstrained, such that movement of the electromagnet causes the bottom member and spring shaft to move in a generally arcuate motion, with the bending of the spring member tending to bias the spring shaft in a central position that is generally aligned with the longitudinal axis of the handle. The shape, dimensions and material of the spring member may vary from application to application to reduce noise and/or provide the workpiece with a desired motion.

The spring mechanism may be implemented into a replacement head for a toothbrush, wherein the bristle head, neck and spring shaft, including the bottom member and permanent magnets are capable of being removed from the drive unit and replaced. In another embodiment, however, the spring mechanism may be incorporated into a toothbrush drive unit or a drive unit for an alternative power device, wherein the spring shaft and bottom member are integrated into the handle housing, with a workpiece shaft extending from the housing that is capable of receiving a replacement workpiece, such as a toothbrush head including a neck and bristle head.

BRIEF DESCRIPTION OF THE DRAWINGS

FIG. 19 is a rear view of a bristle head according to one embodiment.

FIG. 20 is a side view thereof.

FIG. 21 is a front view thereof.

FIG. 22 is a bottom view thereof.

FIG. 23 is another front view thereof.

FIG. 24 is a close up side view of the portion B shown in FIG. 20.

DETAILED DESCRIPTION OF THE CURRENT EMBODIMENTS

I. Overview

A spring mechanism for use in powered devices such as an electric toothbrush is shown in FIGS. 1-18 and described herein in connection with a number of embodiments. The spring mechanism generally includes: (1) a spring shaft having a first end with one or more magnets and a second end adapted to receive a workpiece; and (2) a spring extending between the spring shaft and a fixed housing. In operation, the spring mechanism operates to convert or translate movement of the magnets into a desired movement of the workpiece at a desired frequency.

Figure 1:
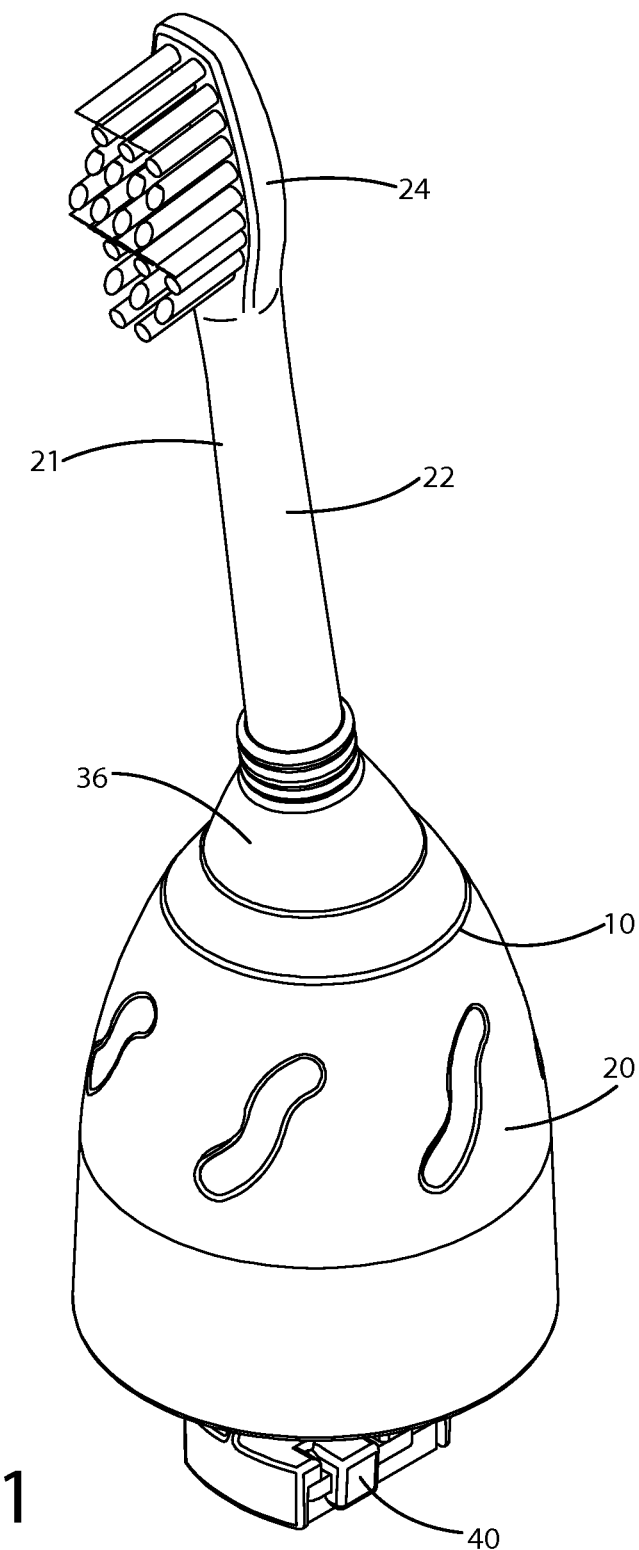
FIG. 1 is a perspective view of a replacement head for an electromagnetic drive toothbrush according to one embodiment of the present invention.
Figure 2:
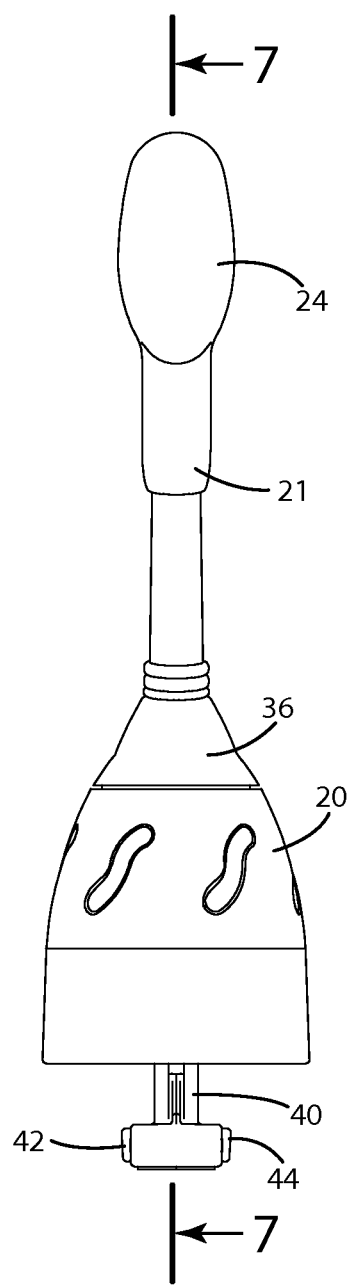
FIG. 2 is a front view thereof.
Figure 3:
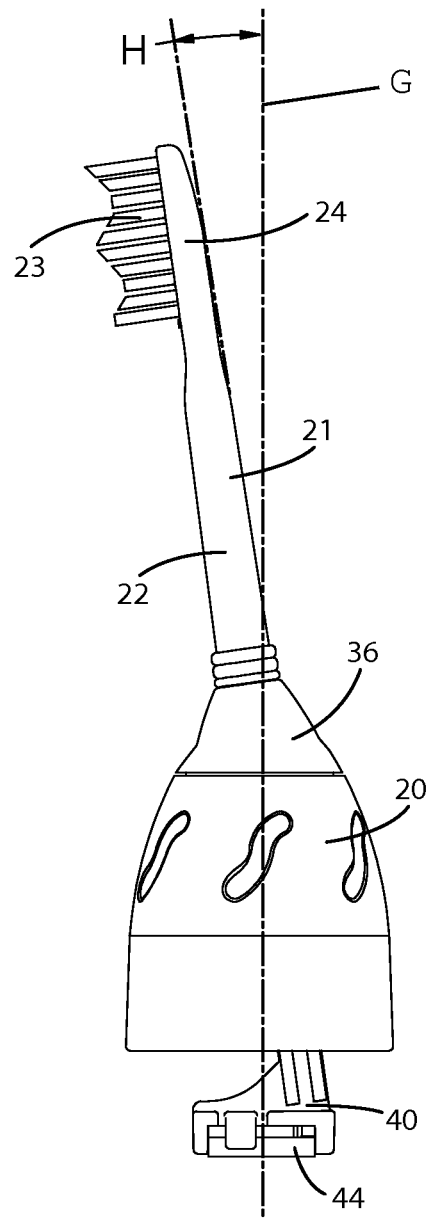
FIG. 3 is a side view thereof.

A first embodiment showing the spring mechanism integrated into a replacement head for an electric toothbrush is shown in FIGS. 1-5 and generally designated 10. As illustrated in FIGS. 1-5, the replacement head 10 is designed for removable attachment to a drive unit, such as the electromagnetic drive unit 12 shown in FIG. 5. A second embodiment showing the spring mechanism integrated into a replacement head for an electric toothbrush is shown in FIGS. 6-12 and generally designated 110 (it should be noted that FIGS. 1-3 are generic to the first and second embodiments, and that description of the features shown in FIGS. 1-3 may apply to each of the first two embodiments discussed herein). Similar to the first embodiment, the replacement head 110 is designed for removable attachment to a drive unit similar to the electromagnetic drive unit 12 depicted in FIG. 5. A third embodiment of the spring mechanism is shown in FIGS. 13-18. In this embodiment, the spring mechanism is incorporated directly into an electromagnetic toothbrush drive unit 210. Additional embodiments are also contemplated, for instance, wherein the spring mechanism is incorporated into a drive unit designed to receive one of more of a variety of workpieces, including, but not limited to, personal care devices such as toothbrush heads and exfoliating brushes, medical devices such as cast saws and bone saws, powered cleaning devices such as jewelry cleaners and other scrubbers, massagers, toys with movable parts such as animal figures, powered oscillating tools such as sanders, cutting devices and polishers, vibratory pumps and sonic noise devices such as bug and vermin repellants. One example of such an embodiment with an alternative workpiece is shown in FIGS. 25-31.

II. Structure

As noted above, electromagnetic drive units are well known; therefore, the drive unit 12 will not be described in great detail herein. With reference to the replacement head embodiments shown in FIGS. 1-12, suffice it to say that the drive unit 12 includes a power source, such as a battery or AC power supply, and a switch that is operable by the user. The drive unit 12 includes a drive mechanism that may be a DC drive or an AC drive. In one embodiment, the drive unit 12 includes an electromagnet 13 positioned within the drive unit 12 that is actuated when the user presses the switch. The electromagnet 13, or a pair of electromagnets, may be actuated to oscillate between positive and negative polarities within the drive unit 12. The oscillation may be over a range of resonant frequencies of the electromagnet. As depicted in FIGS. 1-12, the drive unit 12 includes an opening at the upper end 16 that receives a portion of the replacement head 10 (or 110). In one embodiment, the electromagnet 13 is positioned within the drive unit 12 proximate to the upper end 16 such that it can magnetically engage and drive the replacement head 10 (or 110).

In addition, with reference to the embodiments shown in FIGS. 1-12, the drive unit 12 typically includes structure for removably attaching to the replacement head 10 (or 110), and for aligning the replacement head on the drive unit 12. In one embodiment, the drive unit 12 may include an upper cylindrical portion 18 at the upper end 16 that includes external threads 19 for attaching to a threaded cover 20 on the replacement head 10. The opening at the upper end 16 of the drive unit 12 may be shaped to align the replacement head on the drive unit 12 when the replacement head 10 is attached to the drive unit 12. In one embodiment, the opening is generally round, with one flat surface (i.e. D-shaped) that engages an opposing flat surface on a similarly shaped portion of the replacement head 10 (or 110) to align the replacement head 10 and prevent rotation of the replacement head 10 with respect to the drive unit 12 outside the desired range of rotation. Alternatively, the drive unit 12 may include a rib or groove, or another conventional alignment structure, including, but not limited to a friction fit, to receive corresponding structure on the replacement head. The friction fit may be configured to meet a desired removal force parameter that provides an optimal balance between the desire to retain the replacement head on the drive unit and the desire for ease of removal. In one embodiment, the friction fit is configured to be between 0.5 lbf and 20 lbf of force, and in a more particular embodiment between about 2 and 8 lbf.

Referring to the first embodiment shown in FIGS. 1-5, the replacement head 10 generally includes a bristle head 21 having an elongated neck 22 with a head 24 at one end, a cover 20, and a spring mechanism 40 for converting the generally linear motion provided by the electromagnet into curvilinear motion at the head 24. As illustrated, the head 24 includes a plurality of bristles 23 that may be of various lengths extending outwardly from the head 24. In another embodiment, the head 24 may include one or more alternative cleaning elements, such as elastomeric elements, extending from the head 24. Additional views of a bristle head 21 are shown in FIGS. 19-24, wherein various desirable, yet optional, dimensions are provided for the neck 22, head 24 and bristles 23.

The cover 20 is a shell that extends at least partially over the exterior of the spring assembly 40. In the embodiment illustrated in FIGS. 1-5, the cover 20 includes an opening 32 that extends over the upper portion of the drive unit 12. The interior of the opening 32 may include a series of threads 34 for securing the cover 20 and the replacement head 10 to the drive unit 12. A sealing cap 36 may be fitted within the upper end of the cover 20 and extend between the cover 20 and the neck 22 to prevent water from entering the interior of the cover 20. At least a portion of the sealing cap 36 may be formed from a flexible, resilient material, and in one embodiment the sealing cap 36 is formed as a two-component piece with an upper portion 35 formed from a flexible, resilient material such as a thermoplastic elastomer and a lower portion 37 formed from a rigid material. The two components 35, 37 may be connected to one another by overmolding, for example. In one embodiment, a sealing O-ring 31 may be positioned above the sealing cap 36 to further seal off the cover 20. The sealing O-ring may be provided in varying colors to enable users to identify their replacement head. As shown in FIG. 3, the cover may define a longitudinal axis G extending through the center of the opening 32. When connected to a drive unit 12, the longitudinal axis G may be aligned with the longitudinal length of the drive unit 12.

Figure 4:
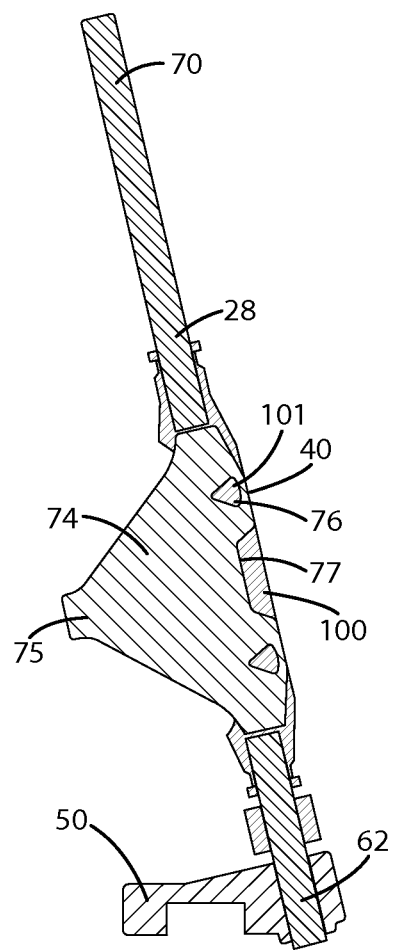
FIG. 4 is a detailed view of components for a spring and shaft for use in one embodiment of the present invention
Figure 5:
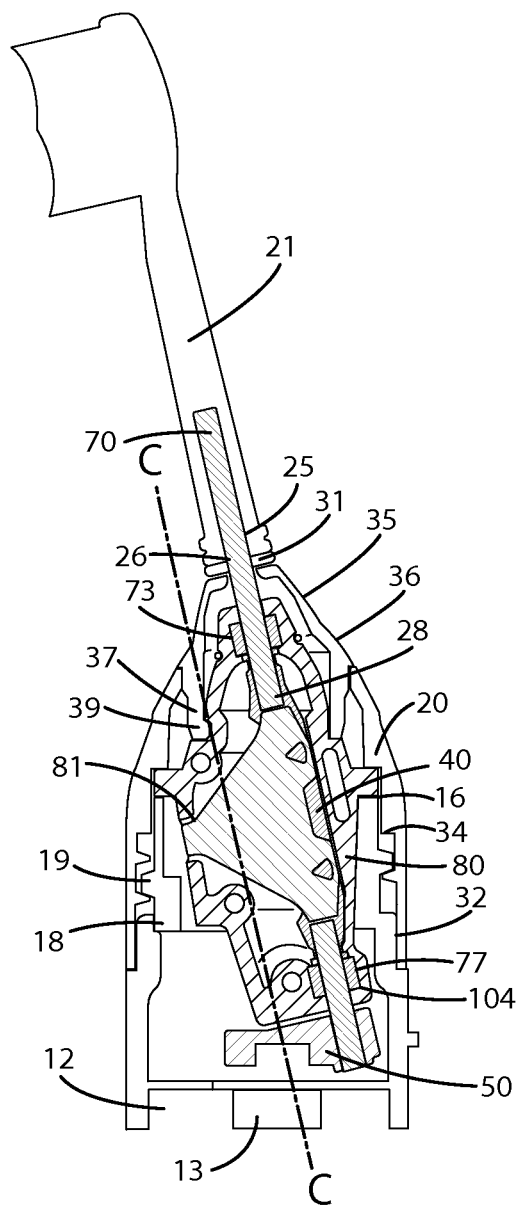
FIG. 5 is cross sectional view of one embodiment of the replacement head taken along line A-A of the replacement head shown in FIG. 2.

Referring to FIGS. 4-5, the spring mechanism or assembly 40 includes a spring shaft 28 having an upper end 70 and a lower end 62. The spring shaft 28 may be configured to extend between a bottom member 50 and the bristle head 21. As shown in FIG. 4, the spring shaft 28 is an elongated shaft formed from one or more pieces. In one embodiment, the shaft 28 is generally circular in cross-section, although other cross-sectional shapes may be used. The cross-section may vary along the length of the drive shaft 28, for example, to include one or more portions with flat or "D-shaped" cross sections. In the illustrated embodiment, the shaft 28 is oriented at an angle H from the longitudinal axis G of the cover 20. As described in more detail below, this angle H is one of a number of factors that contribute to a desired workpiece motion, and may be varied from application to application. As illustrated, the angle H is about 9 degrees.

The lower end 62 end of the shaft 28 may extend into, and/or be fixed, partially or completely to the bottom member 50. The bottom member 50 may function as a holder for one or more permanent magnets. In one embodiment, a pair of magnets 42, 44 (one positive, one negative) are attached to the bottom member 50, for instance, by molding the magnets into the bottom member 50, or with an adhesive or by other known means. Alternatively, the magnets 42, 44 may be indirectly connected to the bottom member 50 by an intermediate plate, for example. The bottom member 50 may extend laterally outwardly from the spring shaft 20, and in one embodiment may extend at an angle from the spring shaft 28. In one embodiment, the magnets 42, 44 are positioned on the bottom member 50 such that they are offset from the longitudinal axis of the shaft 28. As a result, alternating polarities of the electromagnet will cause the magnets 42, 44 to move the bottom member 50 in an arcuate path. The bottom member 50 includes an outer periphery that is smaller than the size of the opening within the drive unit 12, so that the bottom member 50 is capable of moving back and forth and/or up and down within the opening of the drive unit 12. When the replacement head 10 is attached to the drive unit, the magnets 42, 44 extend into the opening in the drive unit such that they are positioned proximate to the electromagnet 13 within the drive unit 12. In one embodiment, the magnets 42, 44 may be replaced by a ferromagnetic material, such as steel, that can be attracted to and repelled by the electromagnet 13 within the drive unit 12.

The spring mechanism 40 may also include a spring, such as the flat spring 74. In the embodiment illustrated in FIGS. 1-5, the flat spring 74 is generally triangular shaped, but the spring 74 may be any desired shape, depending on the application and the desired movement of the bristle head 21. The spring 74 is attached to the shaft 28 in laterally extending, or outwardly radially extending, orientation relative to the shaft 28. The spring 74 may be affixed to the drive shaft by placement of a spring overmold 100 such as, but not limited to, an elastomeric, glass, or polymeric overmolding. The spring 74 may be held in a desired position and/or location along and/or around the shaft 28 by locating an edge of the flat spring 74 within a flattened section, if present, along the spring shaft 28. In addition, the spring may be secured in place within the overmold 100; by providing tabs 101 in the overmold 100 adapted to extend into openings 76 in the spring 74 during the molding process; or by a combination of these and other known securing mechanisms.

The spring 74, spring overmold 100, and at least a portion of the spring shaft 28 may be contained within a spring housing 80. In this first embodiment, the spring housing 80 may act to constrain the motion of the shaft 28 and overmold 100. For example, the spring overmold 100 may be constrained relative to the spring housing 80 by a pair of bearings 73, 77 that—upon movement of the bottom member 50—align the shaft 28 along a rotation axis and cause rotation of the spring shaft 28 and the overmold 100 with respect to the spring housing 80 about the rotation axis. In the illustrated embodiment, the rotation axis is defined by the longitudinal length of the spring shaft 28. The bearings 73, 77 may each include bushings 104 on the spring shaft 28 on either side of the overmold 100. The bushings 104 may be held in place by the spring housing 80. In one embodiment, the lower portion 37 of the sealing member 36 may include tabs 39 that interfit with a portion of the spring housing 80 to removably attach the sealing member 36 to the housing 80. In an alternative embodiment, the spring mechanism 40 may include only one of the bearings 73, 77, noting that removal of one of the bearings would unconstrain a portion of the shaft 28 and ultimately alter the movement of the bristle head 21.

The spring 74 extends from the spring shaft 28 to a distal end 75. In one embodiment, the distal end 75 is held in place by providing an opening or notch 81 in the spring housing 80 capable of receiving the end 75. In the illustrated embodiment, the end 75 of the spring is fitted into the notch, but not affixed in the notch 81. The spring end 75 and notch 81 are therefore configured to allow the end 75 of the spring 74 to move in and out of the notch 81 during operation, discussed in more detail below. As the spring shaft 28 and overmold 100 rotate (due to the operation of the magnets), the spring 74 is forced to bend. The spring 74 may have a bend axis as depicted by line C-C in FIG. 5, such that the spring 74 bends about the bend axis during operation to bias the spring shaft 28 in a central position. The bend axis C-C may be offset from the axis of the spring shaft 28. The amount of this offset, the direction of the bend axis, and the force required to bend the spring may be predetermined by the shape, thickness and material characteristics of the spring 74. For example, a thicker spring material will increase the force required to bend the spring and reduce the amount that the spring will bend during operation. Elements such as slots and holes may further be incorporated into the spring, or multiple springs, to provide the spring(s) with desired characteristics.

Figure 6:
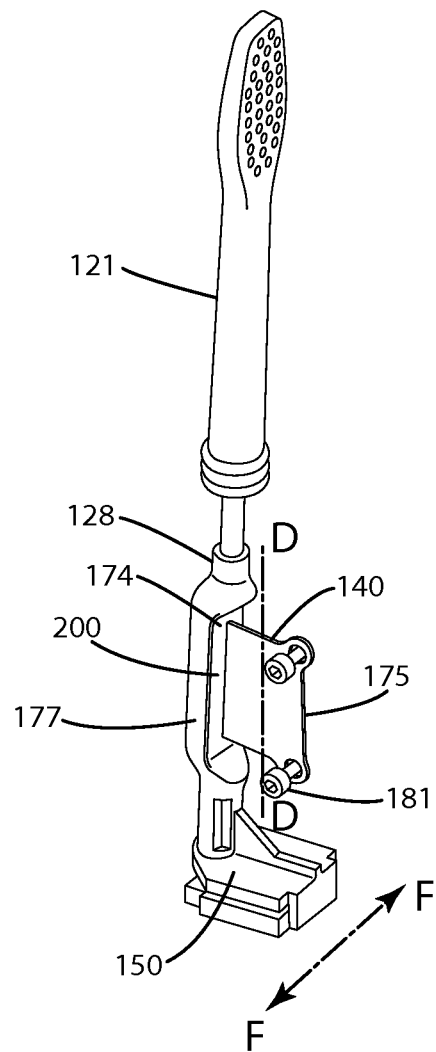
FIG. 6 is a detailed left side view of components for a spring and shaft for use in a second embodiment of the present invention.
Figure 7:
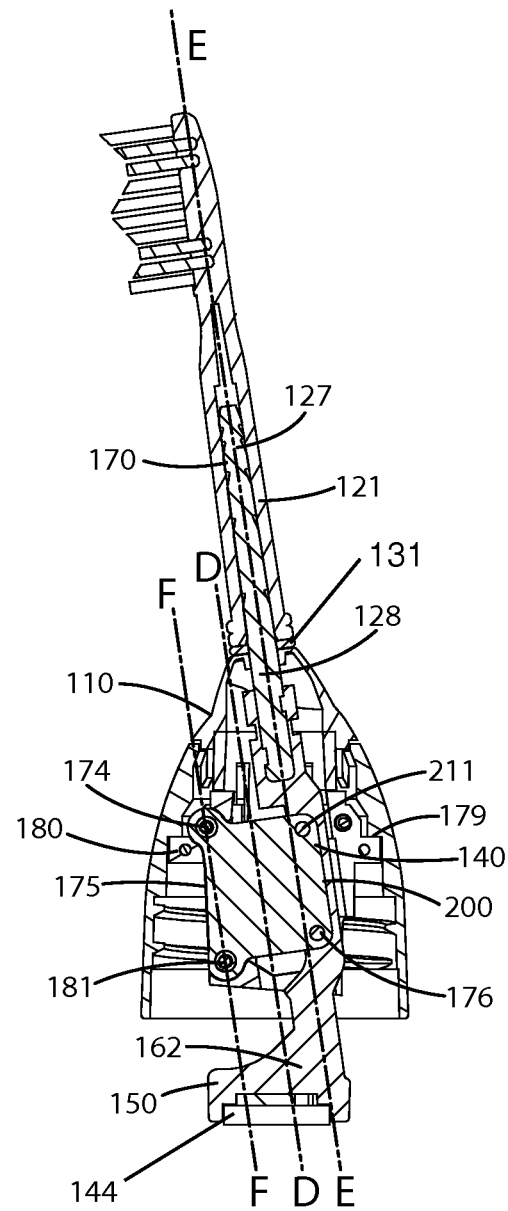
FIG. 7 is a cross sectional view of the second embodiment of the replacement head taken along line A-A of the replacement head shown in FIG. 2.
Figure 8:
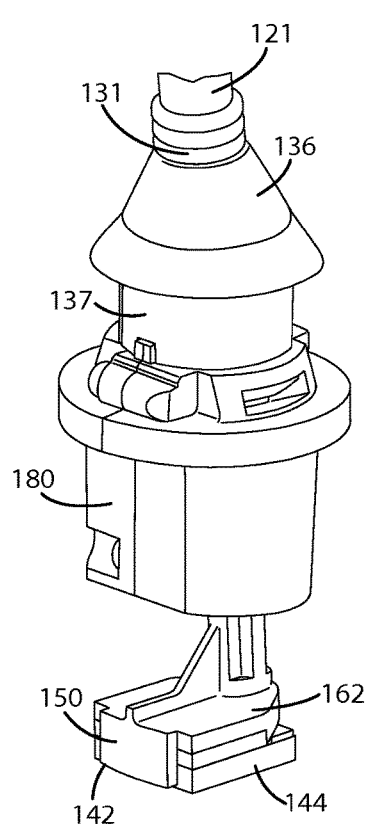
FIG. 8 is a perspective view of a portion of the spring mechanism of the second embodiment.
Figure 9:
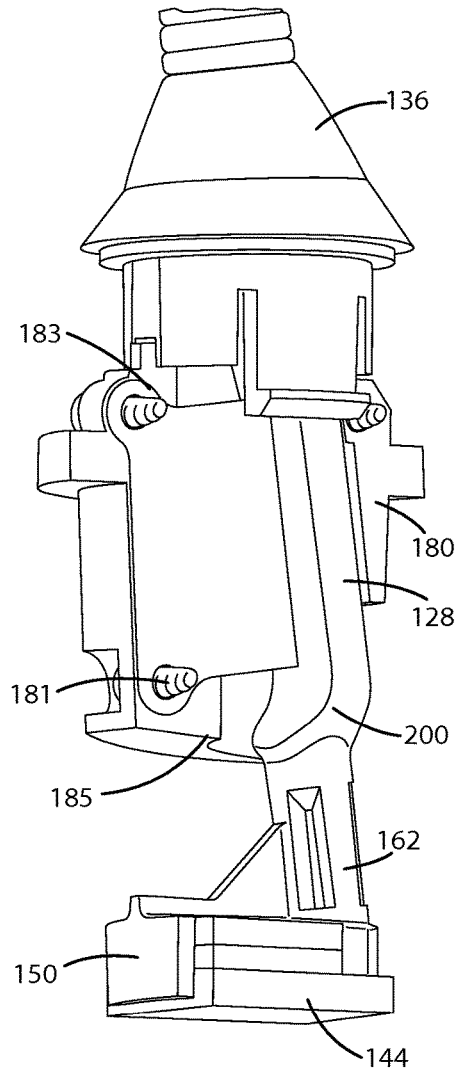
FIG. 9 is a partial cross section of the spring mechanism of the second embodiment.
Figure 10:
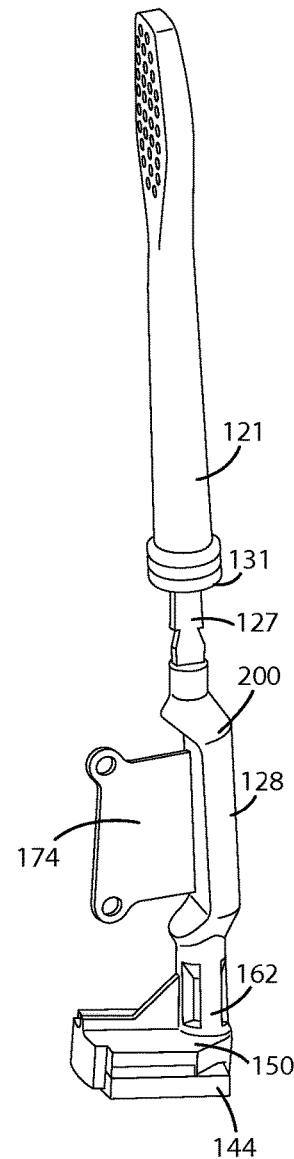
FIG. 10 is a right side detailed view of components for a spring and shaft for use in the second embodiment.
Figure 11:
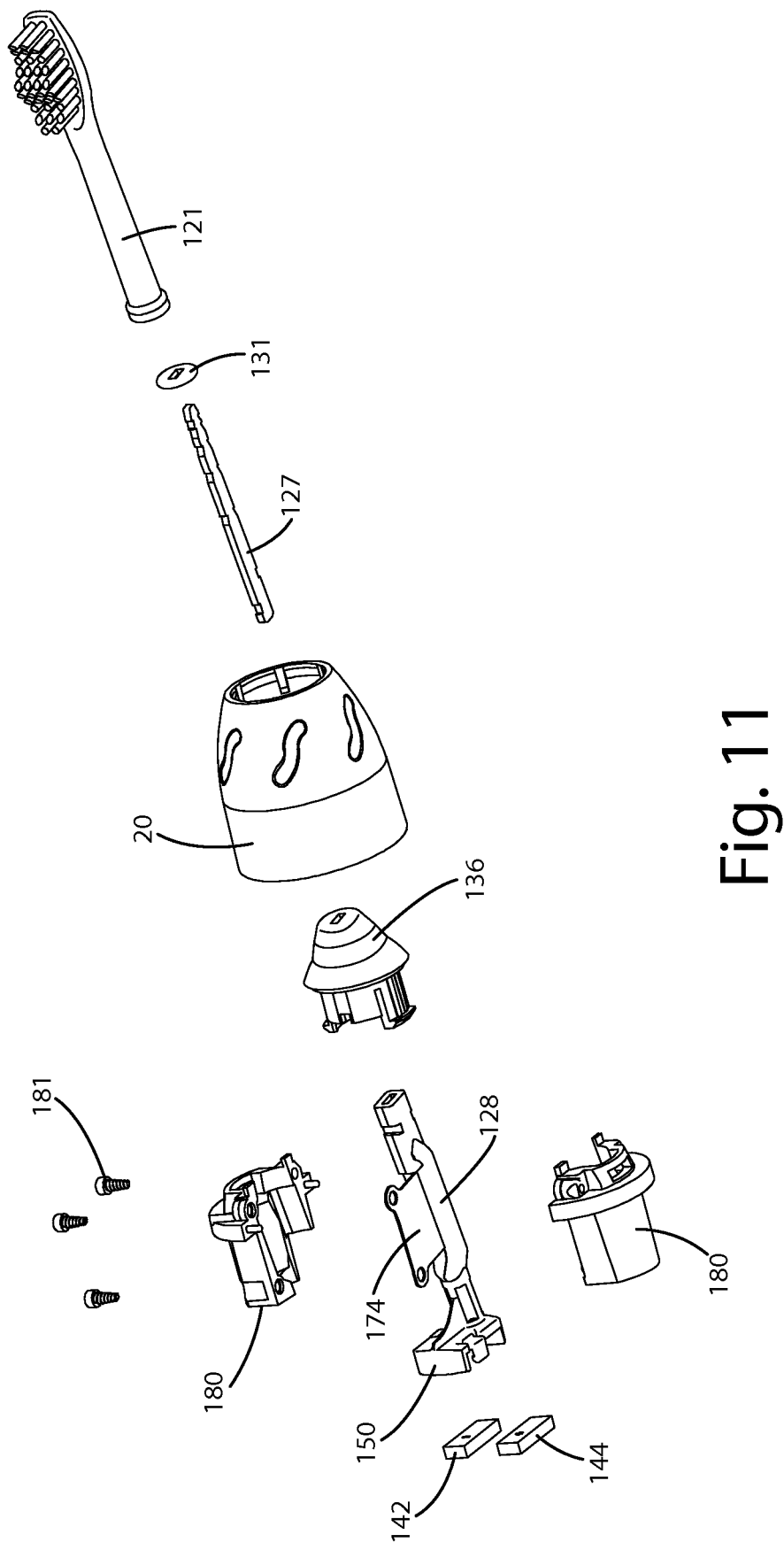
FIG. 11 is an exploded view of a replacement head according to the second embodiment.

A second replacement head embodiment is shown and described with reference to FIGS. 6-12 (as noted above, FIGS. 1-3 and the components shown therein are also generic to FIGS. 6-12). This embodiment includes a spring mechanism 140 similar to that discussed with respect to FIGS. 1-5. The spring mechanism 140 may include a shaft 128 configured to extend between a bottom member 150 and a bristle head 121. As shown in FIGS. 6-7, the shaft 128 has a lower end 162 and an upper end 170. The shaft 128 may have any cross-sectional shape as discussed above with respect to FIGS. 1-5. In one embodiment, the shaft 128 includes an optional overmold 200, which may by itself form a lower portion of the shaft 128. The overmold 200 may be attached to the upper portion of the shaft 127 by a variety of methods, such as inserting the upper portion 127 of the shaft into a mold and then overmolding the overmold 200 such that the overmold 200 forms the lower portion of the shaft 128. Of course, in another embodiment, a single unitary shaft may extend completely through the overmold.

The spring mechanism 140 further includes a spring 174, which, as illustrated in FIGS. 6-7 is generally flat, and generally rectangular in shape. However, as discussed above, the spring 174 may have the triangular shape of the spring 74, or otherwise be any desired shape, thickness or material, depending on the desired frequency and motion of the bristle head. The spring 174 includes an end 177 that is fixedly attached to the spring shaft 128 in laterally extending, or outwardly radially extending, orientation relative to the shaft 128. In one embodiment, the spring 174 may be attached to the shaft 128 within the overmold 200 in a manner similar to the spring 74, wherein the spring 174 includes holes 176 such that tabs 211 in the overmold 200 may extend through the holes 176 to attach the spring to the shaft 128.

The spring 174 may include a housing end 175 opposite the shaft end 177. The spring mechanism 140 of the second embodiment varies from that of the first embodiment in that the spring mechanism 140 includes no bearings to constrain the spring shaft 128, and in that the housing end 175 of the spring is affixed to a spring housing 180. As a result, the unconstrained shaft 128 is capable of moving in an arcuate path about the bending axis D-D of the spring 174. More particularly, the housing end 175 may be fastened to the spring housing 180 by at least one screw 181 or other similar fastener. In the illustrated embodiment, two fasteners 181 attach the housing end 175 to the housing 180 so that the entire length of the housing end 175 is fixed with respect to the housing 180. As with the spring 74 of the first embodiment, the size, shape and characteristics of the spring 174 may vary and can impact the location of the bend axis D-D (depicted in FIGS. 6 and 7) relative to the shaft 128. As shown, the spring 174 is configured such that the distance between the spring shaft axis E-E and a line F-F defining the location of attachment of the spring 174 to the housing 180 (hereinafter referred to as the "spring width") is about 0.375 in, and the location of the bending axis D-D is about at the midpoint of the spring width to provide the shaft 128 with the desired range of motion, power and frequency. In another embodiment, the size, shape and thickness of the spring are adjusted so that the location of the bending axis D-D is located nearer to the line of attachment F-F than the spring shaft E-E to provide a greater amount of motion to the workpiece, and in yet another embodiment the spring is configured such that the bending axis is located less than one quarter of the total spring width from the line of attachment F-F. Finally, in an embodiment providing a lesser amount of movement of the spring shaft 128, the spring 174 is configured so that the bending axis D-D is nearer to the spring shaft 128 than the line F-F, and if even less motion is desired the spring 174 may be configured such that the bending axis D-D is located less than one quarter of the total spring width from the spring shaft 128. Furthermore, in the illustrated embodiment the bending axis D-D is aligned approximately parallel to the spring shaft 128 to provide the workpiece with a desired arcuate motion; however in an alternative embodiment the spring and/or the shaft may be configured so that the bending axis D-D is positioned at an angle with respect to the spring shaft 128. The spring 174 characteristics may also impact the return forces of the spring on the drive shaft 128. Upper 183 and lower 185 openings in the housing 180 may be sized and shaped to allow movement of the shaft 128 relative to the housing 180 during operation, wherein no portion of the housing 180 constrains movement of the spring shaft 128 except for the attachment of the spring 174 between the shaft 128 and the spring housing 180.

As illustrated, the spring mechanism 140 includes a pair of magnets 142, 144 (one positive, one negative), attached directly or indirectly to a plate or bottom member 150 in a manner similar to that described above with respect to magnets 42, 44 and bottom member 50. A lower end 162 end of the shaft 128 may be integrated with, extend into, and/or be fixed, partially or completely within an opening in the bottom member 150. The magnets 142, 144 are positioned on the bottom member 150 such that they are offset from the longitudinal axis of the bottom member 150. As a result, alternating polarities of the electromagnet will cause the magnets 142, 144 to move the bottom member back and forth in an arcuate path in the general direction of line F-F in FIG. 6. The bottom member 150 includes an outer periphery that is smaller than the size of the opening within the drive unit 12 so that the bottom member 150 is capable of moving back and forth and/or up and down within the drive unit. When the replacement head 110 is attached to the drive unit, the magnets 142, 144 extend into the opening in the drive unit such that they are positioned proximate to the electromagnet within the drive unit. It should be noted that—in addition to adjusting the characteristics of the springs 74, 174—the size of the magnets 42, 44, 142, 144 and/or position of the magnets on the bottom member 150 can also impact the location of the bend axes C-C, D-D of the first two embodiments, and can impact the force required to deform the spring 74, 174 during operation.

Similar to the first embodiment, a sealing cap 136 may be fitted within the upper end of the cover 120 and extend between the cover 120 and the neck 122 to prevent water from entering the interior of the cover 120. At least a portion of the sealing cap 136 may be formed from a flexible, resilient material, and in one embodiment the sealing cap 136 is formed as a two-component piece with an upper portion 135 formed from a flexible, resilient material such as a thermoplastic elastomer and a lower portion 137 formed from a rigid material. The two components 135, 137 may be connected to one another by overmolding, for example. In one embodiment, a sealing O-ring 131 may be positioned above the sealing cap 136 to further seal off the cover 20. As the spring shaft 128 moves in an arcuate path, the upper portion 137 of the sealing member 136 may flex such that the sealing member 136 does not constrain the movement of the shaft 128.

With reference to both the first and second embodiments, the bristle head 21, 121 may also be replaceable. As shown in FIG. 5, one end 25 of the neck 22 of the replacement bristle head 21 defines an opening 26 for receiving the drive shaft 28. The drive shaft 28 may be slidably inserted into the opening 26, and, in one embodiment, the bristle head 21 is retained in place on the drive shaft by friction, or by snap fit elements (not shown) such as, but not limited to, a detent on the shaft 28 that fits within a notch or hole in the neck 22. The bristle head 21 may be removed from the drive shaft 28 by pulling on the bristle head 21 to overcome the friction force or the retention force of the snap fit elements. In this embodiment, the bristle head 21 can be removed and replaced without replacing the entire toothbrush head 10. In another embodiment, the bristle head may be retained on the drive shaft in a different manner, or it may be more permanently secured with an adhesive or a mechanical attachment to the drive shaft 28.

Figure 12:
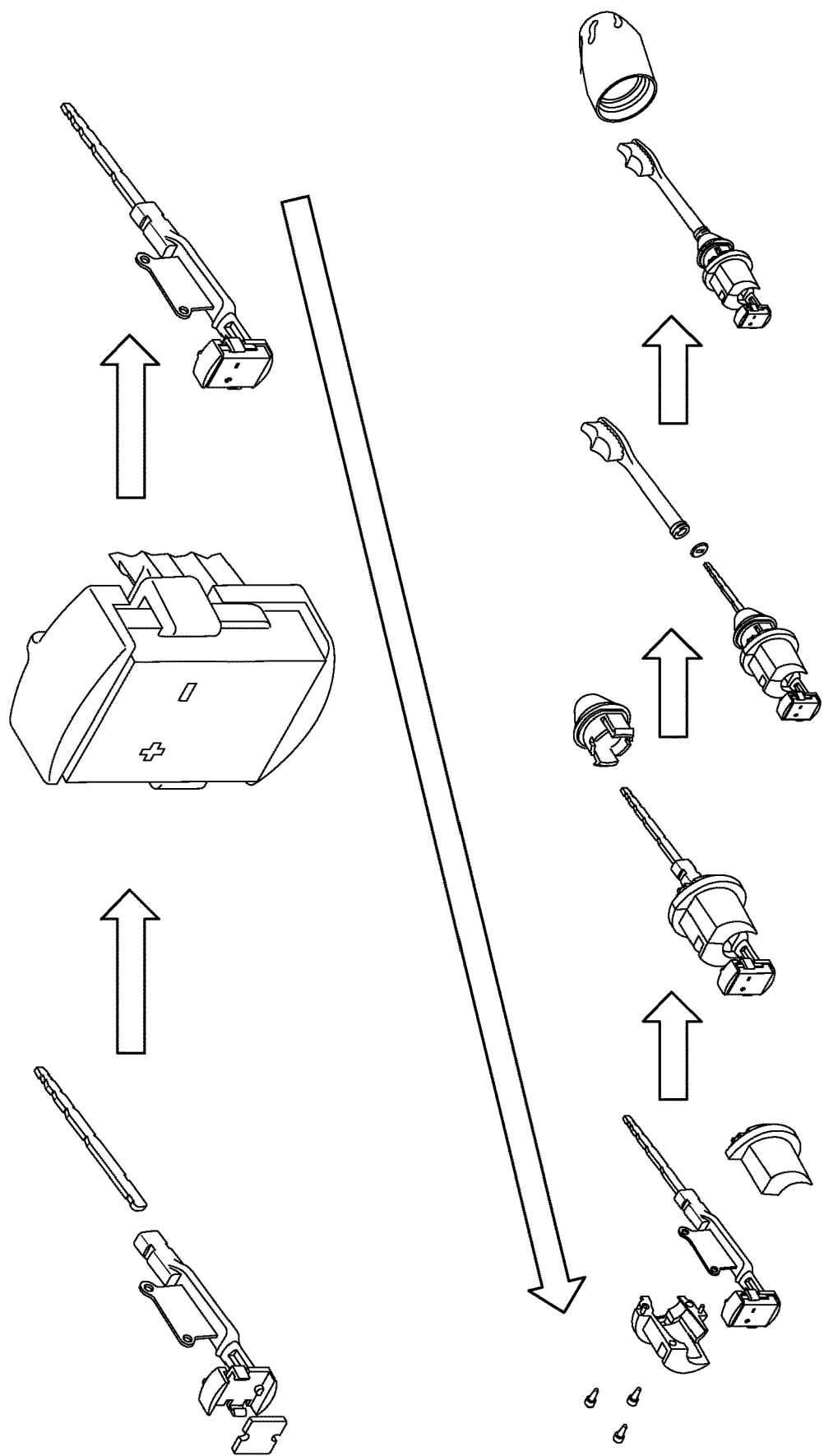
FIG. 12 is a flow chart showing depicting one method for assembling a replacement head according to the second embodiment.
Figure 13:
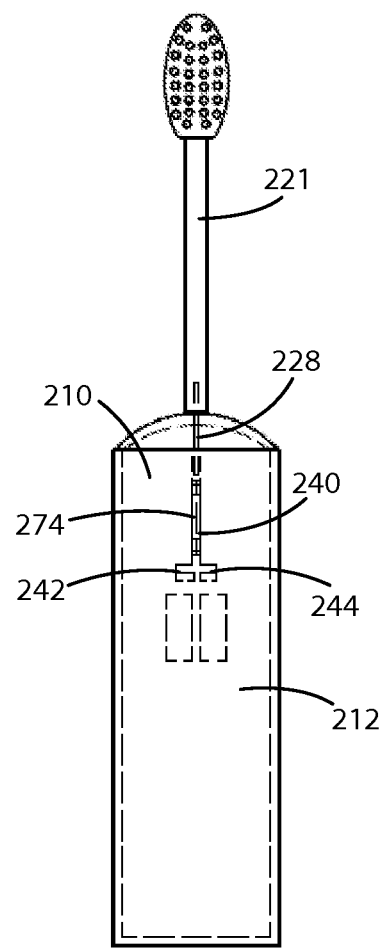
FIG. 13 is a front view of an electric toothbrush according to a third embodiment of the present invention showing internal features in broken lines.

One method for assembling the replacement head 110 is shown in FIG. 12. These steps are just one example of how the replacement head 110 may be assembled according to the configuration of the second embodiment.

A third embodiment of the spring mechanism 210 is depicted in FIGS. 13-18. In many respects, this embodiment is similar to or the same as the second embodiment; however, in this embodiment, the elements of the spring mechanism 240 are incorporated into the drive unit 212, rather than into a replacement head. Therefore, in this embodiment, the bristle head 221 is removable from the shaft 228 in the manner described above in connection with the first two embodiments, but the other elements of the spring mechanism 240, such as the magnets 242, 244, spring 274 and shaft 228 are integrated within the drive unit 212.

Figure 14:
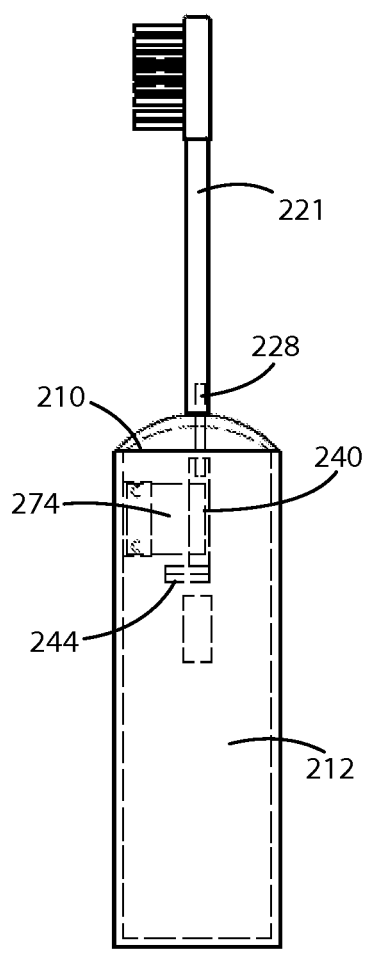
FIG. 14 is side view thereof.
Figure 15:
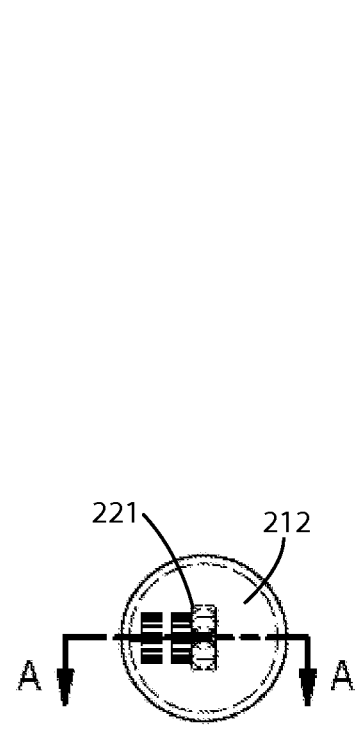
FIG. 15 is a top view thereof.
Figure 16:
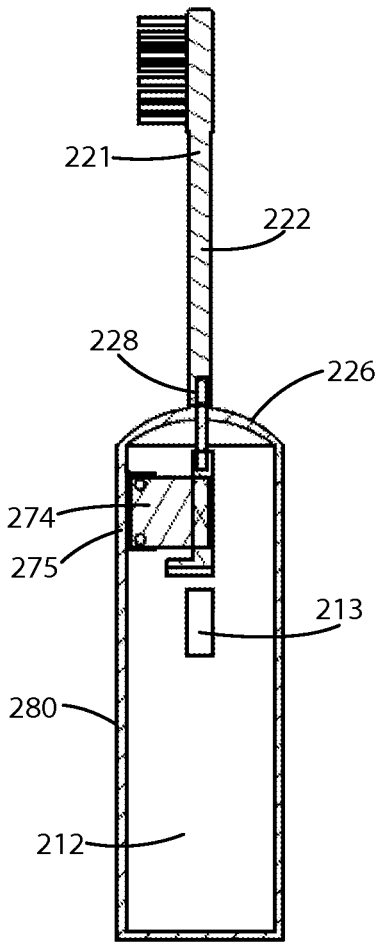
FIG. 16 is cross sectional view taken along line A-A in FIG. 15.
Figure 17:
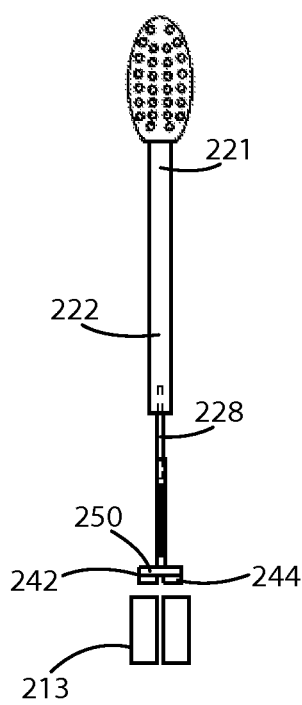
FIG. 17 is a front view of components of a spring and shaft for use in the third embodiment.
Figure 18:
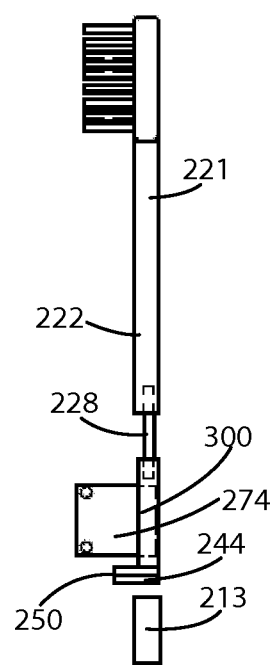
FIG. 18 is a side view thereof.

As shown in FIGS. 17 and 18, the shaft 228, including an upper portion, overmold portion 300, spring 274 and bottom member 250 are substantially the same as that of the second embodiment and thus will not be described again in detail. As shown in FIGS. 14 and 16; however, in this embodiment, the second end 275 of the spring may be affixed to the wall 280 of the drive unit, rather than to a removable spring housing.

In this embodiment, the magnets 242, 244 are positioned within the drive unit 212 proximate to the electromagnet coil 213, such that activation of the coil by the user causes the spring shaft 228, and thus the bristle head 221 to move in an arcuate path. The drive unit 212 may include a flexible seal member 226 attached to the drive unit 212 that permits movement of the spring shaft 228.

Notably, although the above disclosed embodiments are shown in connection with toothbrush heads, they may also be used in connection with other types of workpieces that utilize the same or similar ranges of motion. For example, FIGS. 25-31 show an example of a spring mechanism 340 according to one embodiment of the current invention wherein the workpiece is a cleaning brush 321 and/or an exfoliating brush with bristles 323 arranged generally parallel to the longitudinal length of the neck 322. In this embodiment, the spring mechanism 340 and the shaft 328, including an upper portion, overmold portion 400, spring 374 and bottom member 350 are substantially the same as that of the second embodiment and thus will not be described again in detail. As illustrated, the second end 375 of the spring is affixed to the wall 380 of the drive unit, and the cleaning head 321 may be removable. Alternatively, this type of workpiece arrangement may also be used in connection with a spring housing such that the spring shaft and spring housing also form part of the replacement head.

Figures 25, 26, 27, 28:
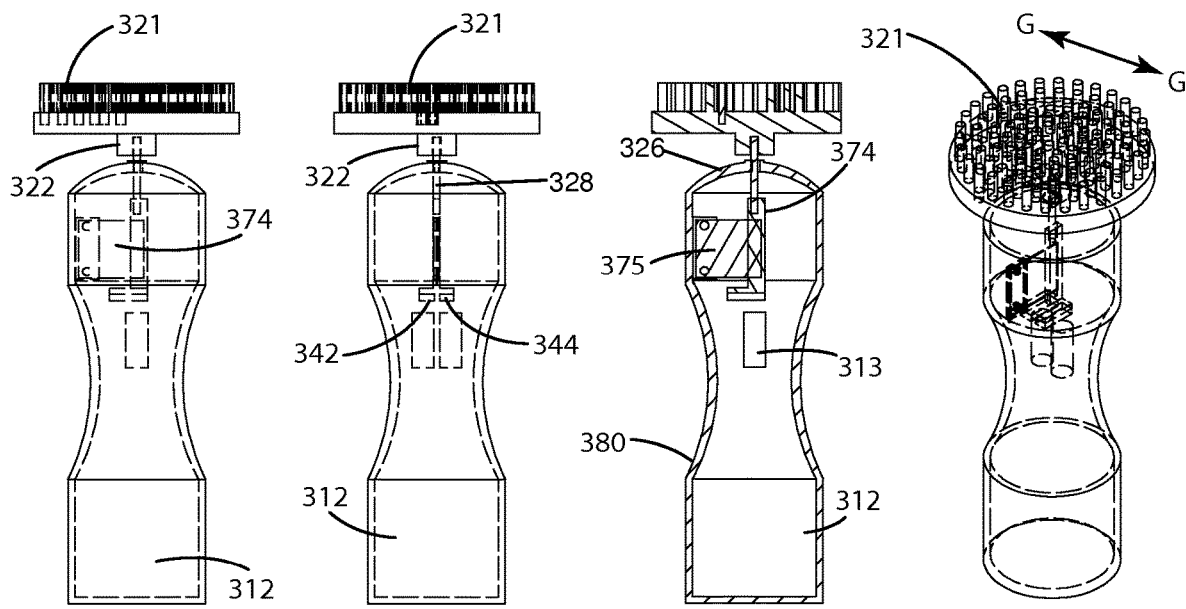
FIG. 25 is a side view of an another embodiment with an alternative workpiece, wherein internal components are shown in broken lines.
FIG. 26 is a front view thereof.
FIG. 27 is a side cross sectional view thereof along line A-A in FIG. 29.
FIG. 28 is a perspective view thereof.
Figures 29, 30, 31:
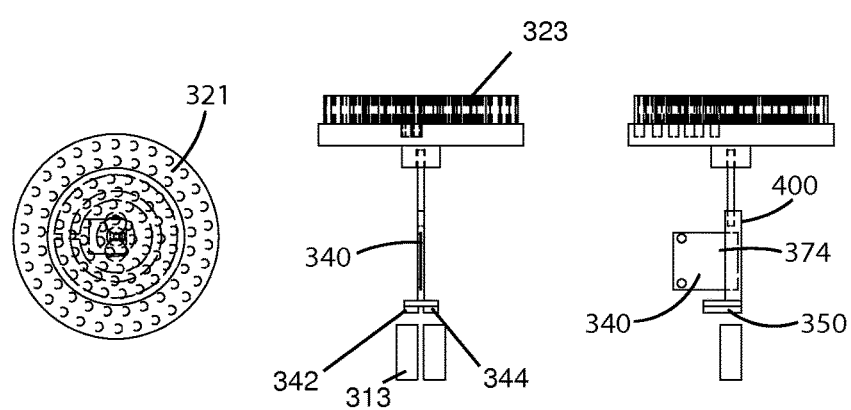
FIG. 29 is a top view thereof.
FIG. 30 is a front view of the spring mechanism with the alternative workpiece.
FIG. 31 is a side view of the spring mechanism with the alternative workpiece.

In this embodiment, the magnets 342, 344 are positioned within the drive unit 312 proximate to the electromagnet coil 313, such that activation of the coil by the user causes the spring shaft 328, and thus the bristle head 321 and tufts 323 to move in an arcuate path generally in the direction of line G-G in FIG. 28. The drive unit 312 may include a flexible seal member 326 attached to the drive unit 312 that permits generally unconstrained movement of the spring shaft 328. The bristles 323 and heads 321 shown in connection with this embodiment may vary from application to application. They may include a set of interchangeable exfoliator brush heads designed for use with different types of skin. Alternatively, they may include stiffer, more abrasive bristles for scrubbing and cleaning applications such as a grout cleanser. Other bristle styles and head orientations may also be used.

Figures 32, 33:
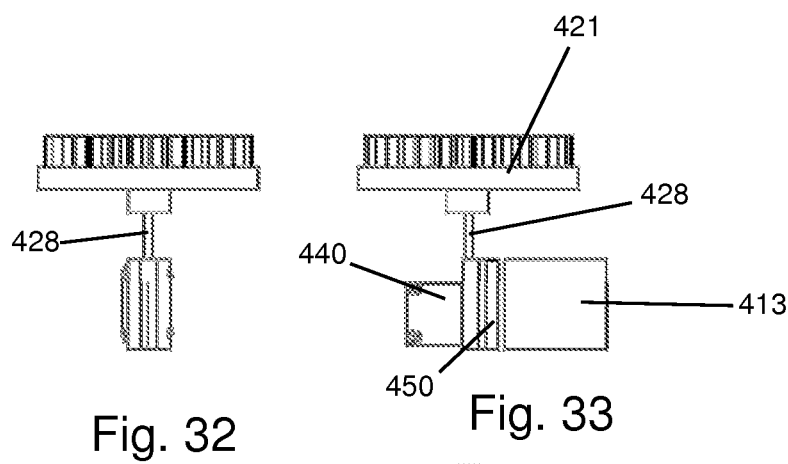
FIG. 32 is a front view of the spring mechanism with the alternative workpiece according to an alternative embodiment.
FIG. 33 is a side view thereof.
Figure 34:
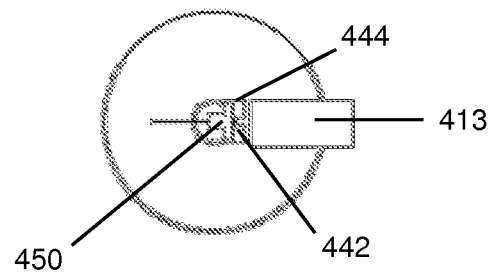
FIG. 34 is a bottom view thereof.

Another embodiment shown in connection with an exfoliator brush, but applicable to a variety of drive units and workpieces, is shown in FIGS. 32-34. This embodiment is substantially the same as the embodiment shown in FIGS. 25-31, except that the electromagnetic coil 413 is positioned alongside the shaft 428, instead of below the shaft as shown in the embodiment of FIGS. 25-31, and the bottom member 450 and magnets 442, 444 are oriented at about 90 degrees from the position show in the embodiment of FIGS. 25-31, such that the magnets 442, 444 are generally parallel to the shaft 428.

III. Operation

During operation, the respective drive units 12, 112, 212, 312 are operated by a switch (not shown). Electromagnets in the drive units 12, 212, 312 may oscillate and/or be controlled to change polarities over a range of frequencies. Referring to the first two embodiments, the replacement heads 10, 110 are connected to the drive unit 12 by inserting the bottom member 50, 150, including magnets 42, 44 or 142, 144 into the opening in the upper end 16 of the drive unit 12. The cover 20 may be secured to the drive unit 12, for instance, with the internal threads 34 on cover 20, to hold the components of the replacement head 10 in place on the drive unit 12 (likewise for the second embodiment).

Referring to all embodiments, the switch can be actuated by the user to actuate the electromagnet at a desired operating frequency. The electromagnet, and its attraction to the permanent magnets 42, 44, 142, 144, 242, 244, 342, 344, 442, 444 (or ferromagnetic material) on the bottom member 50, 150, 250, 350, 450 causes the bottom member 50, 150, 250, 350, 450 to oscillate back and forth in an arcuate path. As described below, in each embodiment, the respective spring mechanism 40, 140, 240, 340, 440 acts to convert the motion provided by the electromagnet(s) into a desired movement of the respective shafts 28, 128, 228, 328, 428 and workpiece heads 21, 121, 221, 321, 421.

Referring to spring mechanism 40 of the first embodiment, the movement of the bottom member 150 causes the shaft 28 to rotate back and forth about an axis because the shaft is constrained by the bearings 73, 77. In the illustrated embodiment, the shaft 128 rotates about its longitudinal axis. The spring 74 acts to control the movement of the shaft 128 and bias the shaft in a central position. The spring 74 being securely attached to the shaft 28, and constrained, but not fixed to, the housing 80, will bend from its substantially flat orientation bending along the bending axis C-C. As the spring 74 bends, the end 75, may move within the notch 81 in the spring housing. The bushings 104, if present, may serve to prevent the overmold 100 and consequently the shaft 28 from traveling in a substantially up and down motion. As the shaft 28 rotates, or oscillates, the toothbrush head 21 similarly rotates or oscillates or moves in an arcuate path.

Operation of the spring mechanism 140 of the second embodiment may be similar to that of the first embodiment, but may have additional freedom in that the spring shaft 128 is not constrained by bearings. Rather the housing end 175 of the spring is affixed to the spring housing 180. As the bottom member 150 is driven to oscillate, the spring 174 bends generally about the bending axis D-D and the drive shaft 128 may move in a generally arcuate motion within the overmold 200. Due to the unconstrained nature of the shaft 128, additional movement of the shaft 128, and thus the bristle head 121 may occur about axes other than the bending axis D-D. As in the first embodiment, the spring 174 acts as a biasing member to return the bottom member 150 to a center position generally aligned with the central longitudinal axis defined by the drive unit 12. Operation of the third and fourth embodiments is similar in almost all respect to that of the second embodiment, except that the springs 274, 374 are affixed to the drive unit 221, rather than a removable spring housing. It should be noted, however, that alternative workpieces such as the workpiece 321 could also be used in connection with the first two embodiments.

As noted above, the motion and frequency of the workpiece, such as the bristle head 21, 121, 221, 321 may be controlled by a variety of variables, which include, but are not limited to, the size, thickness and shape of the spring, the positioning of the magnets on the bottom member, the size and length of the bristles, and the drive frequency of the motor. Each of these variables can be adjusted from application to application to provide a desirable user experience in terms of brushing function, handle vibration and operating noise. In one embodiment, the drive frequency of the motor is between about 60 Hz and 1000 Hz. In a more particular embodiment for use with an electric toothbrush, the drive frequency is between about 200 Hz and 400 Hz. In a more particular embodiment for an electric toothbrush, the drive frequency of the motor is between about 230 Hz and 280 Hz, and in an even more particular embodiment for an electric toothbrush the drive frequency of the motor is set to about 260 Hz. The drive frequency for alternative workpiece applications, such as those listed above, may be increased or decreased depending on the desired power and workpiece motion for the particular application.

After a particular drive frequency is determined, the above noted variables are adjusted to achieve the desired motion and frequency of the bristle head 21, 121, 221, 321 while maintaining a relatively low sound level and a relatively low current draw on the motor. In one embodiment for use with an electric toothbrush, the desired frequency of the bristle head is between about 245 Hz and 255 Hz. In another embodiment, the desired range of motion of the tips of the bristles is between about 0.370 mm and 0.575 mm. In yet another embodiment, the desired sound level of the operating toothbrush containing one of the above noted embodiments is below about 73 dB, and more particularly, below about 60 dB.

The above description is that of the current embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The invention claimed is:

1. A spring mechanism for a power device, the device including an electromagnet, the spring mechanism comprising:
   a housing including a sidewall portion;
   a shaft extending through the housing and having a first end coupled to a bottom member and a second end coupled to a bristle head, the shaft defining a longitudinally extending shaft axis, the sidewall portion of the housing being laterally spaced from the shaft;
   at least one permanent magnet associated with the bottom member, the permanent magnet, bottom member, shaft and bristle head oscillating upon actuation of the electromagnet;
   a spring extending laterally between the shaft and the sidewall portion of the housing, the spring being affixed to the shaft and the housing, the spring extending laterally outwardly from the shaft, the spring having a shaft end adjacent the shaft and a housing end adjacent the housing; and
   wherein the shaft moves on an arcuate path about a spring bend axis of the spring and the spring alternates between a deformed position and a return position during the oscillation of the permanent magnet by bending about the spring bend axis, the spring bend axis positioned between the shaft and the sidewall portion of the housing, the spring bend axis offset from and substantially parallel to the shaft axis.

2. The spring mechanism of claim 1 wherein said spring is a flat spring.

3. The spring mechanism of claim 2 wherein said flat spring is in a shape of one of a triangle or a rectangle.

4. The spring mechanism of claim 1 wherein the drive operates at a reduced decibel level.

5. The spring mechanism of claim 1 wherein the electromagnets have a drive frequency between about 250 Hz and about 275 Hz.

6. A spring mechanism for attaching to a power device, the device including a drive unit capable of being actuated by a user, the spring mechanism comprising:
   a housing including a sidewall portion, the housing connectable to a portion of the power device;
   a shaft extending through the housing and having a first end and a second end opposite the first end, the second end coupled to a workpiece, the shaft defining a longitudinally extending shaft axis, the sidewall portion of the housing being laterally spaced from the shaft;
   a bottom member including at least one of a ferromagnetic material and a permanent magnet, the bottom member connected to the first end of the shaft and positioned adjacent the drive unit, wherein the bottom member, shaft and workpiece move upon actuation of the drive unit; and
   a spring extending laterally between the shaft and the sidewall portion of the housing, the spring having a shaft end adjacent the shaft and a housing end adjacent the housing, the spring defining a spring bend axis between the shaft and the sidewall portion of the housing and offset from and substantially parallel to the shaft axis, the spring affixed to the shaft and the housing, wherein the shaft moves on an arcuate path about the spring bend axis and the spring is caused to bend about the spring bend axis between a deformed position and a return position by the movement of the bottom member.

7. The spring mechanism of claim 6 wherein the bottom member extends laterally outwardly from the first end of the shaft, such that the one of the ferromagnetic material and the permanent magnet are offset from the shaft.

8. The spring mechanism of claim 7 wherein the spring extends outwardly from the shaft in the same direction as the bottom member.

9. The spring mechanism of claim 6 wherein the bending of the spring about the spring bend axis causes the shaft to move about the arcuate path such that the workpiece experiences a degree of rotation.

10. The spring mechanism of claim 6, wherein the housing defines a longitudinal axis, and wherein the shaft is positioned at an angle with respect to the longitudinal axis.

11. The spring mechanism of claim 6 wherein the workpiece include a neck aligned with the shaft, a head extending from the neck, and bristles extending laterally outwardly from the head.

* * * * *